May 12, 1925.
P. C. THOMPSON
TIRE HOLDER
Filed Aug. 11, 1923
1,537,096
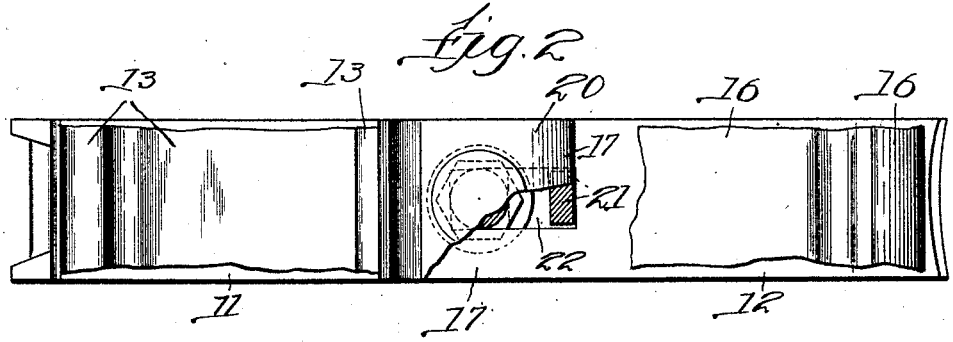
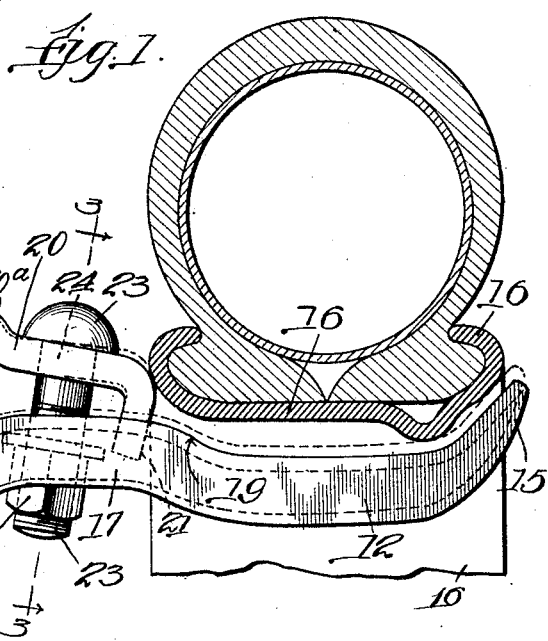
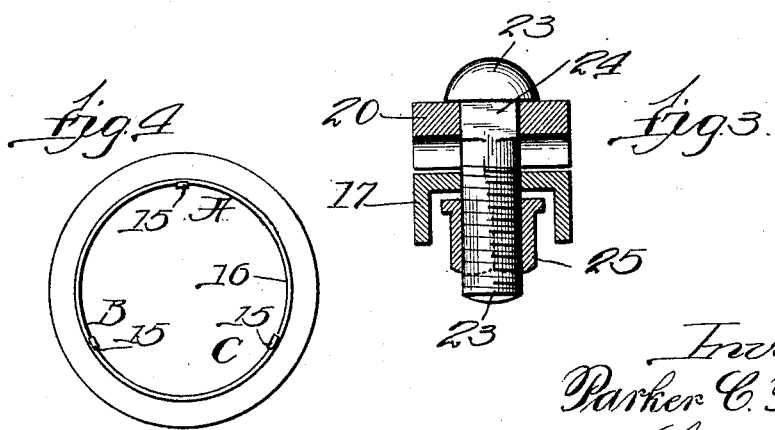
Inventor:
Parker C. Thompson
by Luther Johns
his Atty.

Patented May 12, 1925.

1,537,096

UNITED STATES PATENT OFFICE.

PARKER C. THOMPSON, OF CHICAGO, ILLINOIS, ASSIGNOR TO THOMPSON-NEAYLON MANUFACTURING CO., OF CHICAGO, ILLINOIS, A CORPORATION OF ILLINOIS.

TIRE HOLDER.

Application filed August 11, 1923. Serial No. 656,768.

*To all whom it may concern:*

Be it known that I, PARKER C. THOMPSON, a citizen of the United States, residing in Chicago, Cook County, Illinois, have invented certain new and useful Improvements in Tire Holders, of which the following is a specification.

The present improvements relate to that class of automobile tire holders adapted to support a second spare tire in addition to one carried by a tire holder made a permanent part of the automobile. Their chief object is the provision of simple, cheap, strong and durable, and easily operable means for strongly and securely carrying a second tire and tire rim by attachment to the relatively fixed rim.

It is old and well known to provide three devices about one hundred and twenty degrees apart attachable to the relatively fixed rim carried on the permanent tire carrier for holding such an extra tire and rim. The present improvements relate more particularly to mechanical construction and arrangement whereby the various objects are advantageously attained.

In the accompanying drawings, which form a part of this specification, Figure 1 is a side view of my improved clamping device complete as applied to two spare tires and their rims sectionally shown; Fig. 2 is a broken top view of the construction of Fig. 1 with rim part fragmentarily shown; Fig. 3 is a sectional view on the line 3—3 of Fig. 1; and Fig. 4 is a small face view showing how the device is ordinarily used.

My improved structure includes a rigid body which in my practice is formed from channel iron, as a forging, and is therefore unusually strong. This body consists of two rim-carrying parts 11 and 12, the part 11 being adapted to accommodate the relatively fixed rim 13, which is to be understood as being rigidly carried by the permanent carrier on the automobile, and which permanent carrier may be of any approved form. The body part 11 has its free end 14 formed to engage holdingly and for ready attachment and removability one side of the relatively fixed rim 13, and this part 14 will ordinarily take the form of a simple hooklike member. Its construction may vary according to the particular type of rim to which is is intended to be applied.

The normally free end portion 12 of the body extends in the same general direction as the body 11 and is provided at its free end with an upturned part 15 adapted to form a stop to limit the movement of the second rim 16 in a direction away from the relatively fixed rim 13 when they are side by side and normally held by the device. The body is provided with a normally outwardly-directed formation 17 (outwardly with respect to the axis of the rims) providing shoulders at 18 and 19 respectively adapted to cooperate in holding certain types of the rims and also making for an advantageous arrangement of clamping elements.

A clamping lever 20 has its main body part extending over and longitudinally with the main body, and particularly that part 17 thereof, and at one end has an inwardly directed projection 21 reduced in cross section and adapted to enter loosely a hole 22 in the part 17, and thus the clamping lever rests upon the outer surface of the body part 17 as on a fulcrum and is locked against movement beyond a given amount in a direction away from the rim 13, while being movable freely toward and away from the body part 17.

A bolt 23 has a squared part at 24 which interfits with a square hole in the clamping lever 20 and is preferably driven therein with a tight fit so that when the bolt is moved the lever 20 will move also. The bolt extends transversely through the lever 20 and the body at the part 17 and the nut 25 is adapted to draw the body and the lever toward each other. The hole 22 into which the projection 21 extends is in the form of a slot large and long enough to accommodate also the bolt 23. This slotted construction permits free movement of the bolt from one end of the slot to the other, whereby when the nut 25 is sufficiently retracted to permit the projection 21 to come out of the slot 22 the lever and bolt may be moved in a direction away from the rim 13 and the device may then be more readily hooked upon the rim 13 and swung substantially into its desired position. Thereupon the clamping lever and bolt 20 are moved back toward the rim 13 whereby the slanting surface 20ª of the clamping lever comes into contact with the side of the rim 13 opposite that side engaged by the holding means 14, with the projection 21 again inserted in the slot 22 and against the end wall thereof, and thereupon the nut 25 can be tightened.

The construction is such that when the clamping lever 22 and the body part 17 are considerably spaced apart, but with the projection 21 against the end wall of the slot 22, the clamping device as a whole is held loosely upon the rim 13, and thereupon when the nut is tightened the body part 17 is drawn toward the lever 20 (the rim 13 being understood to be relatively fixed) and this threading action at once tightens the device as a whole upon the rim 13 and swings the end portion 12 of the body outward (away from the axis of the rim) with the result that the second rim 16 is held tightly when the device is normally used.

In using my improved device three separate and independent units such as shown by Fig. 1 are ordinarily used. The practice of applying the second rim would ordinarily be to secure first one of the clamping devices to the relatively fixed rim at A, Fig. 4, and then hang the second rim with its tire upon the outstanding free end part 12, and thereupon apply another unit as at B and a third unit at C, and thereupon tighten all of the clamping nuts 25. To remove the second tire the clamping nut of any one or more of the devices A, B and C, Fig. 4, may be retracted sufficiently to permit the free end or ends 12 to move inward, or toward the axis of the rim, sufficiently to permit the rim as 16 to be slid over the retaining stop or stops 15, whereupon the tire and rim may be lifted away.

I claim:

1. In a tire clamp device of the character described, the combination of a relatively long and narrow rigid body having an outstanding hook-like part at one end for holding engagement with a side of a relatively fixed tire rim and for ready application to and releasement therefrom, said body including a normally free-end part formed to accommodate a second tire rim and being formed to hold such second rim against a material amount of movement in a direction away from such relatively fixed rim when both rims are side by side and held by said clamp device, a clamping lever fulcrumed on said body and overlying the normally outer surface of said body about midway of its ends and extending longitudinally with the body and having a free end portion normally adjacent to and adapted to engage the relatively fixed rim at the side thereof opposite the side engaged by said hook-like part to bind the tire clamp as a whole upon the relatively fixed rim, and a bolt extending transversely through the body and said clamping lever and being positioned between the place where the clamping lever is fulcrumed and its free end for drawing the body toward said clamping lever for clamping the device upon the relatively fixed rim and for moving the free end portion of the body radially outward with respect to the axis of the second rim when normally held by the device.

2. In a tire clamp device of the character described, the combination of a relatively long and narrow rigid body having means at one end for engaging a side of, and holding it upon, a relatively fixed tire rim for ready application to and releasement therefrom, said body including a normally free-end part formed to accommodate a second tire rim and being formed to hold such second rim against a material amount of movement in a direction away from such relatively fixed rim when both rims are side by side and held by said clamp device, a substantially L-shaped clamping lever having a locking projection at one end adapted to enter an opening provided in the body, the clamping lever overlying said body normally in spaced relation thereto about midway of its ends and above the normally outer surface thereof and having a free end portion normally adjacent to and adapted to engage the relatively fixed rim opposite to the place where said first-mentioned means engage the fixed rim and to bind the tire clamp as a whole upon the relatively fixed rim, and screw means transverse of the body and of said clamping lever for drawing the body toward the clamping lever for rim-clamping action, the arrangement being such that when said screw means are retracted the free end part of said body may be inclined inward with respect to the axis of said rims and when the screw means are tightened said free end part will be moved outward into holding engagement with said second rim and the relatively fixed rim will be tightly clamped by the device.

PARKER C. THOMPSON.